United States Patent Office 3,012,016
Patented Dec. 5, 1961

3,012,016
CROSS-LINKING OF PROPYLENE POLYMERS AND COPOLYMERS
David C. Kirk, Jr., Wilmington, and Anderson E. Robinson, Newark, Del., assignors to Hercules Powder Company, Wilmington, Del., a corporation of Delaware
No Drawing. Filed Nov. 20, 1957, Ser. No. 697,511
6 Claims. (Cl. 260—79.5)

The present invention relates to a process for improving the physical properties of normally solid polymers of propylene (polypropylene) and copolymers of ethylene and propylene.

Recent improvements in the art of polymerization have enabled the production of solid, amorphous polypropylene and copolymers of ethylene and propylene that have many of the physical characteristics of rubber and, in fact, offer promise as improved replacement for rubber in many applications. These amorphous polymers (including copolymers) are, in the unadulterated state, thermoplastic and soluble in many organic solvents. Therefore, like rubber, they must be cross-linked, i.e., vulcanized, in order to render them useful for many intended purposes.

Unlike rubber, however, these solid, amorphous polymers are not sulfur-vulcanizable and it has been necessary to seek other methods to effect cross-linking in a manner analogous to the vulcanization of rubber. In copending application, Serial No. 660,028, filed May 20, 1957 by D. C. Kirk, it is disclosed that certain di(aralkyl) peroxides are highly effective as cross-linking agents for the copolymers of ethylene and propylene.

The action of the above di(aralkyl) peroxides in polypropylene is somewhat different. More specifically, polypropylene is degraded when heated in the presence of normal amounts of the di(aralkyl) peroxide, i.e., less than about 10% by weight of the polypropylene, but substantially complete cross-linking of polypropylene can be obtained if the amount of di(aralkyl) peroxide is increased to about 30% of the weight of polymer.

In accordance with the present invention, it has been found that the action of the aforesaid di(aralkyl) peroxides which are definable by the general formula:

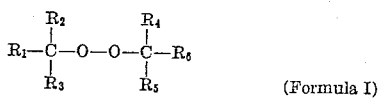

(Formula I)

where $R_1$ and $R_6$ are aryl and $R_2$, $R_3$, $R_4$ and $R_5$ are hydrogen or alkyl groups of less than 4 carbon atoms, as cross-linking agents for both amorphous polypropylene and amorphous copolymers of ethylene and propylene is remarkably enhanced, or augmented, by employing a minor amount of sulfur in combination with the peroxide. In the case of amorphous polypropylene, the effect of sulfur is primarily noticeable in the much lesser amount of di(aralkyl) peroxide that is required to effect cross-linking. In the case of the amorphous copolymers of ethylene and propylene, the presence of sulfur results in a decrease in the amount of di(aralkyl) peroxide required for optimum results and, additionally, leads to a substantial enhancement of the physical properties of the cross-linked copolymer.

In accordance with the aforesaid discoveries, the present invention provides a process of cross-linking a polymer selected from the group consisting of amorphous polypropylene and amorphous copolymers of ethylene and propylene which comprises heating the polymer in the presence of a minor amount of a di(aralkyl) peroxide (Formula I) and a minor amount of sulfur to a temperature at which cross-linking takes place.

The following examples illustrate specific embodiments of the invention. All parts and percentages are by weight unless otherwise specified. The molecular weight of the polymers employed in the examples is shown by the reduced specific viscosity (RSV) given therein. By the term "reduced specific viscosity" is meant the specific viscosity, corrected to zero shear gradient, divided by the concentration of the solution in grams per 100 milliliters, measured at 135° C., on a solution in decalin containing 0.1 gram of the polymer in 100 milliliters of the solution.

EXAMPLE 1

The polymer employed in this example was amorphous polypropylene having an RSV of 2.5 which has been prepared by the polymerization of propylene in n-heptane at atmospheric pressure in the presence of a catalyst comprising a mixture of aluminum triisobutyl and a hydrocarbon-insoluble reaction product of titanium tetrachloride and aluminum sesquichloride.

The polypropylene was milled with 3.5% of its weight of bis(α,α-dimethylbenzyl) peroxide for five minutes at 130° F. and to this mixture there was then added 5 parts of sulfur, 2.5 parts of tetramethylthiouram disulfide, 5 parts of zinc oxide and 2 parts of stearic acid which were incorporated by blending an additional five minutes at 130° F. The composition was next molded under pressure for 30 minutes at 330° F. to form molded slabs ⅟₁₆ inch thick.

To show that the polypropylene had been substantially cross-linked, a 100 milligram pellet was placed in 30 milliliters of toluene in a closed bottle and allowed to stand at room temperature for 48 hours. The swollen pellet was then removed and carefully dried. Calculation showed that a substantial proportion of the cross-linked polypropylene had not dissolved in the toluene. By contrast, when the same polypropylene was treated in the same manner with only 3.5% bis(α,α-dimethylbenzyl) peroxide as an additive, degradation of the polypropylene resulted and the composition obtained after press cure was 100% soluble in toluene, thus showing that sulfur not only suppressed degradation but enabled substantial cross-linking to take place.

EXAMPLE 2

The polymer employed in this example was an amorphous copolymer of 50 mole percent ethylene and 50 mole percent propylene having an RSV of 4.3 and which had been prepared by the copolymerization of ethylene and propylene in the same manner that the polypropylene of Example 1 was prepared.

A master batch of the copolymer and 50% of its weight of high-abrasion furnace black was first prepared on a two-roll mill by blending for 5 minutes at 160° F. The master batch was then divided into several portions and, with the exception of a control portion in which no other additives were incorporated, each portion was blended with a specified amount of bis(α,α-dimethylbenzyl) peroxide and/or sulfur according to the following table:

*Table I*

| | Composition No. | | | | | | | | | |
|---|---|---|---|---|---|---|---|---|---|---|
| | 1 | 2 | 3 | 4 | 5 | 6 | 7 | 8 | 9 | 10 |
| Bis(α,α-dimethylbenzyl) peroxide—parts per hundred parts of copolymer | 0 | 0 | 4 | 4 | 4 | 4 | 8 | 8 | 8 | 8 |
| Sulfur—parts per hundred parts of copolymer | 0 | 2 | 0 | 1 | 2 | 4 | 0 | 1 | 2 | 4 |

Each composition was next molded 30 minutes at 320° F. to form sheets about 0.062 inch thick and specimens cut from these sheets were then tested for tensile strength and maximum elongation. The data obtained are as follows:

*Table II*

| Composition No. | Tensile Strength [1] (p.s.i.) | Max. Elongation [1] (percent) |
| --- | --- | --- |
| 1 | 630 | 1,300 |
| 2 | 585 | 1,560 |
| 3 | 1,960 | 330 |
| 4 | 2,895 | 490 |
| 5 | 2,965 | 640 |
| 6 | 2,880 | 770 |
| 7 | 1,795 | 200 |
| 8 | 2,425 | 260 |
| 9 | 2,665 | 420 |
| 10 | 2,835 | 600 |

[1] Average of two tests.

From the above table, it is seen that those compositions in which both bis(α,α-dimethylbenzyl) peroxide and sulfur were present had markedly superior tensile strength as compared to the compositions in which either no additive or only one of the specified additives was present.

EXAMPLE 3

In place of bis(α,α-dimethylbenzyl) peroxide employed in Example 2, a like amount in turn of each of the following peroxides was incorporated:

bis(α,α-dimethyl-p-t-butylbenzyl) peroxide
bis(α,α-dimethyl-p-isopropylbenzyl) peroxide
bis(α,α-dimethyl-p-methylbenzyl) peroxide
bis(α-isopropylbenzyl) peroxide
benzyl(α,α-dimethyl-p-isopropylbenzyl) peroxide and in each instance the benefits of sulfur were apparent.

As has been demonstrated in the examples, the physical properties of amorphous polypropylene and copolymers of ethylene and propylene can be markedly improved by heating in the presence of sulfur and a peroxide of Formula I to effect cross-linking.

The invention is applicable to all amorphous polymers of propylene and copolymers of ethylene and propylene, the amorphous copolymers being those that contain not more than 85 mole percent of ethylene. Polymers of this type can be prepared by any of several processes now known to the art. They can be prepared, for example, by polymerizing propylene or copolymerizing ethylene and propylene under relatively mild conditions of temperature and pressure in the presence of a catalyst comprising a mixture of a compound of a metal of groups IV—B, V—B or VI—B of the periodic table in combination with an organometallic compound of an alkali metal, alkaline earth metal, zinc, earth metal (especially aluminum), or rare earth metal. The compound of a group IV—VI—B metal may be any inorganic salt or organic salt or complex of titanium, zirconium, hafnium, vanadium, columbium, tantalum, chromium, molybdenum, tungsten, thorium or uranium. Exemplary of such compounds are titanium and zirconium tetrachloride, tetrabutyl titanate, zirconium acetylacetonate, vanadium oxyacetylacetonate, chromium acetylacetonate, etc. The organometallic compound that is used in combination with the transition metal compound may be any organo compound of an alkali metal, alkaline earth metal, zinc, earth metal or rare earth metal as, for example, alkali metal alkyls or aryls such as butyllithium, amylsodium, phenylsodium, etc., dimethylmagnesium, diethylmagnesium, diethylzinc, butylmagnesium chloride, phenylmagnesium bromide, alkyl- or aryl-aluminum compounds as, for example, triethylaluminum, tripropylaluminum, triisobutylaluminum, trioctylaluminum, dimethylaluminum chloride, diethylaluminum chloride, ethylaluminum dichloride, the equimolar mixture of the latter two known as aluminum sesquichloride, diisobutylaluminum chloride or fluoride, diethylaluminum hydride, ethylaluminum dihydride, diisobutylaluminum hydride, triphenylaluminum, diphenylaluminum chloride, etc., and complexes of such organometallic compounds as, for example, sodium aluminum tetraethyl, lithium aluminum tetraoctyl, etc. The polymerization is usually carried out by mixing the two catalyst components in a diluent such as a hydrocarbon solvent and then passing ethylene and propylene into the catalyst mixture at atmospheric or slightly elevated pressure and at room temperature or moderately elevated temperatures.

Alternatively, the polymers can be prepared, for example, by the method described in Belgian Patent No. 535,082 in which the catalyst is characterized by containing, as essential ingredients, an oxide of chromium associated with an oxide of silicon, aluminum, zirconium or thorium.

Still further, polymers can be prepared, for example, by the methods described in U.S. 2,700,663, 2,702,288 and 2,726,231, which methods are characterized by a catalyst comprising a molybdenum-oxygen compound combined with an active supporting material.

The peroxides useful in this invention are di(aralkyl) peroxides having the structural formula:

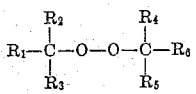

where $R_1$ is an aryl group, $R_2$, $R_3$, $R_4$ and $R_5$ are hydrogen or alkyl groups of less than 4 carbon atoms, and $R_6$ is an aryl group. $R_2$, $R_3$, $R_4$ and $R_5$ may all be the same or each may be a different group or any two or more may be the same or different. Similarly, $R_1$ and $R_6$ may be the same or different aryl groups.

The aryl groups referred to in the above formula may, for example, be phenyl, naphthyl, anthryl, phenanthryl, and the like. The aryl groups may contain alkyl substituents as in the case of methylphenyl, ethylphenyl, propylphenyl, isopropylphenyl, butylphenyl, isobutylphenyl, t-butylphenyl, pentamethylethylphenyl, dimethylphenyl, methylethylphenyl, etc., and corresponding alkyl derivatives of the other aryl groups mentioned. The term "aryl" as used herein includes alkaryl groups. When an alkyl substituent in an aryl group contains less than 4 carbon atoms, it may be the same as or different from any of $R_2$, $R_3$, $R_4$ or $R_5$. Aryl groups in which the alkyl substituents, if any, contain less than 8 carbon atoms are preferred.

The class of di(aralkyl) peroxides useful in the invention include the following symmetrical or bis(aralkyl) peroxides: dibenzyl peroxide, bis(α-methylbenzyl) peroxide, bis(α-ethylbenzyl) peroxide, bis(α-propylbenzyl) peroxide, bis(α-isopropylbenzyl) peroxide, bis(α,α-dimethylbenzyl) peroxide, bis(α-methyl-α-ethylbenzyl) peroxide, bis(α,α-diethylbenzyl) peroxide, bis(α,α-dipropylbenzyl) peroxide, bis(α,α-diisopropylbenzyl) peroxide, bis(α,α-diisopropylnaphthylmethyl) peroxide, bis(α,α-dimethylnaphthylmethyl) peroxide, bis(α,α-dimethyl-p-methylbenzyl) peroxide, bis(α-methyl-α-ethyl-p-methylbenzyl) peroxide, bis(α,α-diethyl-p-methylbenzyl) peroxide, bis(α,α-diisopropyl-p-methylbenzyl) peroxide, bis(α,α-dimethyl-p-ethylbenzyl) peroxide, bis(α-methyl-α-ethyl-p-ethylbenzyl) peroxide, bis(α,α-diethyl-p-ethylbenzyl) peroxide, bis(α,α-diisopropyl-p-ethylbenzyl) peroxide, bis(α,α-dimethyl-p-isopropylbenzyl) peroxide, bis(α-methyl-α-ethyl-p-isopropylbenzyl) peroxide, bis(α,α-diethyl-p-isopropylbenzyl) peroxide, bis(α,α-diisopropyl-p-isopropylbenzyl) peroxide, bis(α,α-dimethyl-p-t-butylbenzyl) peroxide, bis(α-methyl-α-ethyl-p-t-butylbenzyl) peroxide, bis(α,α-diethyl-p-t-butylbenzyl) peroxide, bis(α,α-diisopropyl-p-t-butylbenzyl) peroxide, bis(α,α-dimethyl-p-pentamethylethylbenzyl) peroxide, bis(α-methyl-α-ethyl-p-pentamethylethylbenzyl) peroxide, bis(α,α-diethyl-p-pentamethylethylbenzyl) peroxide, and bis(α,α-diisopropyl-p-pentamethylethylbenzyl) peroxide.

Unsymmetrical peroxides useful in the invention containing two aryl groups include the following compounds: benzyl(α-methylbenzyl) peroxide, benzyl(α - methyl - p-methylbenzyl) peroxide, benzyl(α-methyl - p - isopropylbenzyl) peroxide, benzyl(α,α-dimethylbenzyl) peroxide, benzyl(α,α-dimethyl-p-methylbenzyl) peroxide, benzyl-(α,α-dimethyl-p-isopropylbenzyl) peroxide, α - methylbenzyl(α,α-dimethylbenzyl) peroxide, α - methylbenzyl(α,α-dimethyl-p-methylbenzyl) peroxide, α-methylbenzyl(α,α-dimethyl-p-isopropylbenzyl) peroxide, α-isopropylbenzyl-(α,α-diisopropylbenzyl) peroxide, α,α-dimethylbenzyl(α,α-dimethyl-p-methylbenzyl) peroxide, α,α - diisopropylbenzyl(α,α-diisopropyl - p - methylbenzyl) peroxide, and α,α-diisopropylbenzyl(α,α - diisopropyl - p - isopropylbenzyl) peroxide.

In general, the peroxides are characterized by containing at least 14 carbon atoms and usually not more than about 40 carbon atoms. Di(aralkyl) peroxides containing 14 to about 25 carbon atoms are preferred as producing very desirable vulcanizates and because they may be prepared from readily available materials. The symmetrical peroxides are exceptionally useful since they can be prepared in higher yields more easily than the unsymmetrical peroxides.

The process of the invention is characterized by heating an amorphous polymer of the type defined in the presence of a peroxide of Formula I and sulfur. There are various ways in which the peroxide and sulfur may be incorporated with the polymer prior to heating. For example, the polymer, peroxide and sulfur can be uniformly blended by simple milling on a conventional rubber mill with or without a small amount of solvent to temporarily plasticize the polymer. In this way, the peroxide and sulfur become uniformly distributed through the polymer and cross-linking is effected when the blend is later heated. In some cases a mere application of peroxide and sulfur to the surface of the polymer may be all that is needed. In such case, for instance, a finely divided polymer may be treated with a solution of the peroxide in which sulfur is dispersed, this treatment resulting in the incorporation of a desired amount of peroxide and sulfur on the surface of the polymer which later diffuses into the polymer and promotes cross-linking when the polymer is later heated, as, for instance, in a molding operation. Other methods of incorporating the peroxide and sulfur will be apparent to those skilled in the art, the method chosen being primarily a matter of choice depending on the convenience of the operator and the ultimate objective in mind.

The amount of peroxide in relation to the amount of polymer is quite widely variable but the optimum amount depends on such factors as the initial molecular weight of the polymer, temperature at which cross-linking is to be carried out, variation in other ingredients present, and similar factors. Generally speaking, however, the optimum amount of peroxide will be within the range of from about 0.1% to about 20% by weight of the polymer, but more often will be in the narrower range of from about 1 to 10%. The amount of sulfur that is required to achieve the benefits of the invention is also quite widely variable and the optimum amount will normally be from about 0.5 to 20 parts by weight of the polymer. Of course, as in the case of the peroxide, this optimum amount will vary according to the other variable factors in the invention.

The temperature to which the polymer must be heated in the presence of the peroxide and sulfur to bring about cross-linking is also quite variable. Cross-linking can be effected, for example, in the range of about 270–400° F. for a time, varying inversely with temperature, ranging from about 2 to 100 minutes.

The manner in which the polymer is heated can vary according to the objective in mind. For example, a polymer in which the peroxide and sulfur have been incorporated can be molded by pressure or extrusion while at the same time applying heat to raise the temperature to that required for cross-linking. In other cases, it may be sufficient to heat the polymer in an oven or equivalent apparatus.

In addition to the essential ingredients in the practice of the invention, i.e., the polymer, peroxide and sulfur, other ingredients can also be present. Normally, such ingredients include those used in the art of rubber vulcanization such as, for instance, extenders, fillers, pigments, plasticizers, etc. The presence of a filler, in particular, is often beneficial and among the fillers, the various forms of carbon black have been shown to provide excellent properties in the practice of the invention.

What we claim and desire to protect by Letters Patent is:

1. A process of cross-linking a polymer selected from the group consisting of solid, amorphous polypropylene and solid, amorphous copolymers of ethylene and propylene, said copolymers containing not more than 85 mole percent of ethylene, which comprises heating said polymer in the presence of a minor, effective amount not exceeding about 20% by weight of the polymer, of a di(aralkyl) peroxide having the formula:

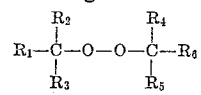

where $R_1$ and $R_6$ are aryl groups and $R_2$, $R_3$, $R_4$ and $R_5$ are selected from the group consisting of hydrogen and alkyl groups of less than 4 carbon atoms, and a minor, effective amount not exceeding about 20% by weight of the polymer, of sulfur to a cross-linking temperature of at least 270° F., said peroxide and said sulfur comprising in combination the sole cross-linking agent.

2. The process of claim 1 in which the peroxide is bis(α,α-dimethylbenzyl) peroxide.

3. The process of claim 1 in which the polymer is heated to a temperature in the range of from about 270 to 400° F.

4. The process of claim 1 in which the polymer is solid, amorphous polypropylene.

5. The process of claim 1 in which the polymer is a solid, amorphous copolymer of ethylene and propylene.

6. A cross-linked polymer selected from the group consisting of solid, amorphous polypropylene and a solid, amorphous copolymer of ethylene and propylene, said copolymer containing not more than 85 mole percent of ethylene, which has been prepared by heating said polymer in the presence of a minor, effective amount not exceeding about 20% by weight of the polymer, of a di(aralkyl) peroxide having the formula:

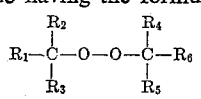

where $R_1$ and $R_6$ are aryl groups and $R_2$, $R_3$, $R_4$ and $R_5$ are selected from the group consisting of hydrogen and alkyl groups of less than 4 carbon atoms, and a minor, effective amount not exceeding about 20% by weight of the polymer, of sulfur to a cross-linking temperature of at least 270° F., said peroxide and said sulfur comprising in combination the sole cross-linking agent.

References Cited in the file of this patent

UNITED STATES PATENTS

| | | |
|---|---|---|
| 2,430,993 | Rehner et al. | Nov. 18, 1947 |
| 2,455,910 | Anderson | Dec. 14, 1948 |
| 2,710,291 | Little | June 7, 1955 |
| 2,748,104 | Viohl | May 29, 1956 |
| 2,819,256 | Boardman | Jan. 7, 1958 |
| 2,825,721 | Hogan et al. | Mar. 14, 1958 |
| 2,826,570 | Ivett | Mar. 11, 1958 |
| 2,850,490 | Canterino | Sept. 2, 1958 |
| 2,890,187 | Bowman et al. | June 9, 1959 |

FOREIGN PATENTS

| | | |
|---|---|---|
| 538,782 | Belgium | Dec. 6, 1955 |